United States Patent
Baba

(10) Patent No.: US 9,559,573 B2
(45) Date of Patent: Jan. 31, 2017

(54) METHOD OF MANUFACTURING STATOR OF ELECTRIC ROTATING MACHINE

(71) Applicant: Shinji Baba, Chiyoda-ku (JP)

(72) Inventor: Shinji Baba, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 692 days.

(21) Appl. No.: 13/870,681

(22) Filed: Apr. 25, 2013

(65) Prior Publication Data

US 2014/0115875 A1    May 1, 2014

(30) Foreign Application Priority Data

Oct. 26, 2012 (JP) ................................ 2012-236232

(51) Int. Cl.
*H02K 15/00*  (2006.01)
*H02K 15/10*  (2006.01)
*H02K 15/12*  (2006.01)

(52) U.S. Cl.
CPC ............ *H02K 15/105* (2013.01); *H02K 15/12* (2013.01); *Y10T 29/49009* (2015.01)

(58) Field of Classification Search
CPC ................... Y10T 29/49009; Y10T 29/49002; H02K 15/12; H02K 15/125; H02K 15/105; H02K 15/085

(Continued)

(56) References Cited

U.S. PATENT DOCUMENTS 3,710,437 A * 1/1973 Kipple .................. H02K 15/12
                                                             264/272.2
4,616,407 A * 10/1986 Tamaki .................... H02K 3/38
                                                                29/596

(Continued)

FOREIGN PATENT DOCUMENTS

CN    101282066 A    10/2008
JP    58-26552 A     2/1983

(Continued)

OTHER PUBLICATIONS

Communication dated Sep. 11, 2015, issued by the State Intellectual Property Office of the P.R.C. in corresponding Chinese Application No. 201310148776.3.

*Primary Examiner* — Peter DungBa Vo
*Assistant Examiner* — Azm Parvez
(74) *Attorney, Agent, or Firm* — Sughrue Mion, PLLC; Richard C. Turner

(57) ABSTRACT

A method of manufacturing a stator of an electric rotating machine is provided. The stator includes a plurality of teeth radially extended from a yoke portion formed by stacking steel sheets, a stator core having an insulating film on a surface of the teeth, and a winding portion including a plurality of layers of a power generating coil wound around each of the plurality of teeth. The method includes: a step of forming an insulating coating film by impregnating the power generating coil in a lower layer portion of the winding portion with a varnish using a liquid-type thermosetting resin, thereafter covering the power generating coil in a surface portion of the winding portion with a thermally meltable powder resin, and melt-bonding and thereafter curing the powder resin; and a step of curing the varnish that is performed simultaneously with the step of forming an insulating coating film.

5 Claims, 5 Drawing Sheets

(58) Field of Classification Search
USPC ....... 29/596, 592.1, 732, 734; 242/433, 430, 242/432; 140/92.1; 310/12.23, 12.21, 49.23, 310/179, 153, 154.01
See application file for complete search history.

(56) References Cited

U.S. PATENT DOCUMENTS

| | | | | |
|---|---|---|---|---|
| 4,624,884 | A * | 11/1986 | Harada | C08K 3/0033 242/432 |
| 5,685,910 | A * | 11/1997 | Thigpen | B05D 3/02 118/306 |
| 6,137,198 | A * | 10/2000 | Kawamura | H02K 3/522 310/71 |
| 7,694,409 | B2 * | 4/2010 | Mo | H02K 15/12 29/596 |
| 7,768,162 | B2 * | 8/2010 | Asao | H02K 3/345 310/45 |
| 2008/0246354 | A1 | 10/2008 | Asao et al. | |

FOREIGN PATENT DOCUMENTS

| | | | |
|---|---|---|---|
| JP | 11-150923 A | | 6/1999 |
| JP | 11150923 A | * | 6/1999 |
| JP | 2012-161153 A | | 8/2012 |

* cited by examiner

METHOD OF MANUFACTURING STATOR OF ELECTRIC ROTATING MACHINE

BACKGROUND OF THE INVENTION

Field of the Invention

This invention relates to a method of manufacturing a stator of an electric rotating machine mounted to, for example, vehicles.

Description of the Related Art

An electric rotating machine that is mounted to a vehicle and used as a power generator or a motor, such as a magnet generator, has a multipolar stator. This multipolar stator has a stator core, which has radially-arranged teeth provided on the outer circumference of an annular yoke portion. Around the outer circumference of each of the teeth of this stator core, a stator coil is wound with an insulating material interposed therebetween. Because the stator coils of such a multipolar stator are affected by vibrations from the engine, a bonding process of bonding the coiled wires of the stator coils to each other with a resin such as a varnish is essential.

A conventionally known method of bonding the coiled wires of the stator coil of the electric rotating machine to be mounted in a vehicle is disclosed in, for example, JP-A-11-150923 (Patent Document 1), in which a varnish resin in liquid form is impregnated between the coiled wires and cured to bond the coiled wires to each other.

Another method of bonding the coiled wires is also known, as disclosed in JP-A-58-26552 (Patent Document 2). In this method, the coiled wires are bonded by bringing thermally meltable powder such as an epoxy resin into contact with the coiled wire surface of the stator coil that has been pre-heated so as to melt the thermally meltable powder, and then curing the thermally meltable powder.

Patent Document 1: JP-A-11-150923
Patent Document 2: JP-A-58-26552

However, conventional coil bonding methods have the following problems, because of circumstances such as an increase of engine vibration that is associated with higher vehicle output performance, a voltage increase in vehicle's power supply system, and maintenance of the coiled wire quality that is commensurate with these.

According to the method disclosed in Patent Document 1 above, it is possible to cause the varnish resin to permeate between the coiled wires and into the coiled wire lower layer portion because of its low viscosity. However, if the bonding of the coil end portion is insufficient and the engine vibration is large, it may be possible that the coil end portion can move and undergo fatigue failure.

In view of the problem, the coil end portion is conventionally bonded in the following manner. In order to bond the coil end portion sufficiently, the above-described bonding process with the varnish resin is performed, and thereafter, the coil end portion is bonded again with a high-viscosity liquid-type varnish resin.

According to the method disclosed in the foregoing Patent Document 2, bonding of the stator coil winding portion exterior, including the coil end portion, is sufficient, but insulation failure may occur between the coiled wires. The reason is as follows. The thermally meltable powder such as epoxy resin does not easily permeate between the coiled wires or into the coiled wire lower layer portion. For this reason, when the engine vibration is large, the coiled wires in the lower layer portion in particular move mutually, and because of the friction between the coiled wires, the insulating coating film on the coil surface wears out.

In addition, since the thermally meltable powder such as epoxy resin does not easily permeate between the coiled wires or into the coiled wire lower layer portion, an insulation failure may occur between the coils and between the coils and the stator core because of pin holes in the coil insulating coating film and pin holes in the core insulating film. The probability of this insulation failure between the coils and between the coils and the stator core becomes higher due to an increase in the voltage of the vehicle electric power supply system.

Furthermore, when merely both the bonding by the impregnation of the liquid-type varnish resin and the bonding by melting and curing the powdered resin are employed, there is a problem of extremely low productivity.

SUMMARY OF THE INVENTION

This invention has been accomplished in view of the foregoing circumstances, and the invention provides a method of manufacturing a stator of an electric rotating machine that can achieve both good productivity and assurance of the coiled wire quality and bonding strength between the coiled wires and in the coiled wire lower layer portion as well as in the coiled wire surface portion including the coil end portion.

This invention provides a method of manufacturing a stator of an electric rotating machine, the stator including a plurality of teeth radially extended from a yoke portion formed by stacking steel sheets, a stator core having an insulating film on a surface of the teeth, and a winding portion comprising a plurality of layers of a coil wound around each of the plurality of teeth, the method including: a step of forming an insulating coating film by impregnating the coil in a lower layer portion of the winding portion with a varnish using a liquid-type thermosetting resin, thereafter covering the coil in a surface portion of the winding portion with a thermally meltable powder resin, and melt-bonding and thereafter curing the powder resin; and a step of curing the varnish that is performed simultaneously with the step of forming an insulating coating film.

The method of manufacturing a stator of an electric rotating machine according to this invention makes it possible to ensure the coiled wire quality and the bonding strength between the coiled wires and in the lower layer portion of the coil winding portion as well as in the coiled wire surface portion including the coil end portion, and to improve the productivity at the same time.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
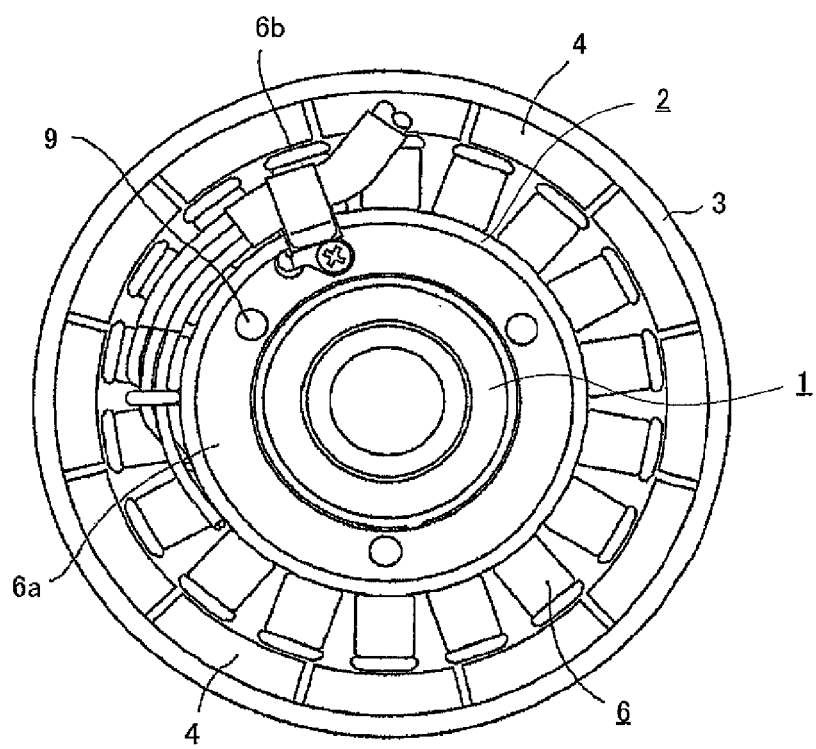
FIG. 1 is a front view of a magnet generator according to a first embodiment of this invention.

Hereinbelow, preferred embodiments of the method of manufacturing a stator of an electric rotating machine according to this invention will be described with reference to the drawings. It should be noted that, in the drawings, the same or corresponding component parts are designated by the same reference numerals.

First Embodiment

Figure 2:
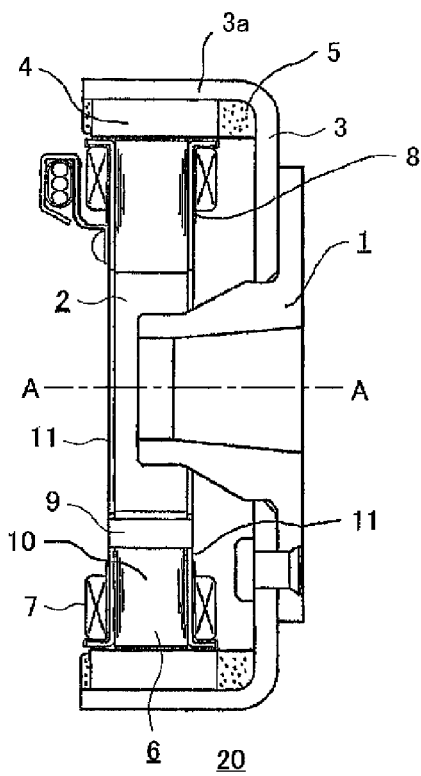
FIG. 2 is a side cross-sectional view of the magnet generator according to the first embodiment of this invention.
Figure 3:
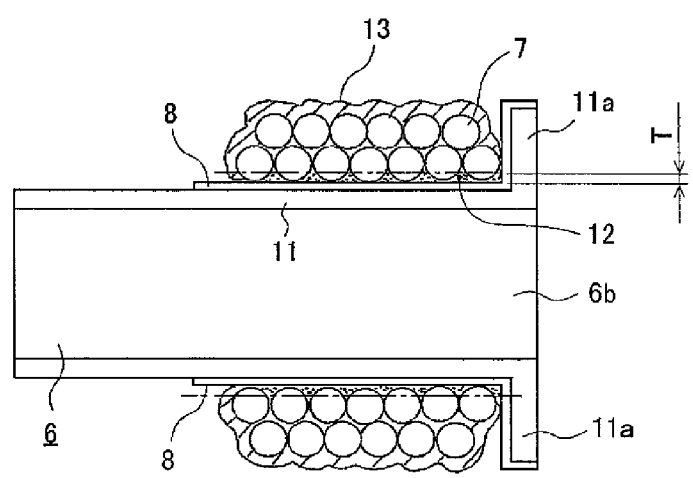
FIG. 3 is a detail view of a power generating coil winding portion of the magnet generator according to the first embodiment of this invention.

FIG. 1 is a front view showing a magnet generator according to a first embodiment of this invention, and FIG. 2 is a side cross-sectional view thereof. FIG. 3 is a detail view showing a power generating coil winding portion of the magnet generator, and FIG. 4 is a view thereof from its right side.

Referring to FIGS. 1 and 2, a magnet generator 20 has a rotor 1 coupled to an internal combustion engine (not shown), and a stator 2 that is an armature provided inside the rotor 1. The rotor 1 has a bowl-shaped flywheel 3 and a plurality of permanent magnets 4 secured to an inner wall surface of the flywheel 3. The rotor 1 is configured so as to rotate about a rotational axis line A-A as the center.

The permanent magnets 4 are secured to the inner circumferential surface of a cylindrical portion 3a of the flywheel 3 by a mold material 5 (see FIG. 2) so as to have regular angular intervals around the rotational axis line A-A. The plurality of permanent magnets 4 are magnetized in such a manner that adjacent permanent magnets 4 have opposite polarities to each other, so that a magnetic field in which its directions change alternately is produced in the space inward of the permanent magnets 4.

The stator 2 has a stator core 6 and a power generating coil 7. The stator core 6 has a circular ring-shaped yoke portion 6a and a plurality of teeth 6b protruding radially outward from the yoke portion 6a at circumferentially regular intervals. The surface of each of the teeth 6b is covered by an insulating film 8 made of a thermoplastic resin material.

In the stator core 6, a plurality of through-holes 9 are formed at circumferential intervals. Mounting bolts (not shown) are allowed to penetrate through the through-holes 9 so as to screw-fasten the stator 2 to a bracket (not shown) that is a non-rotating body, whereby the stator 2 is secured thereto.

The stator core 6 has a laminated body 10 and end plates 11. The laminated body 10 is formed by laminating a multiplicity of layers of circular ring-shaped magnetic steel sheet (for example, cold rolled steel sheet such as SPCC) along the direction of the rotational axis line A-A. The end plates 11 are overlapped respectively on both side faces of the laminated body 10 so as to be in intimate contact therewith.

As shown in FIG. 3, the power generating coil 7 is wound around each of the teeth 6b of the stator core 6 to form a plurality of layers. A lower layer portion of the winding portion is impregnated with a varnish 12 that uses a liquid-type thermosetting resin, and an insulating coating film is formed on a surface of the winding portion by melt-bonding a powder resin 13 such as epoxy resin onto the surface. The thickness T of the varnish 12 in the undermost layer of the winding portion that has been impregnated with the varnish 12 is formed so as to be equal to or greater than the thickness of the insulating coating film formed by the powder resin 13. A bent shape portion 11a, which is bent outward substantially at a right angle, is formed at a tip end portion of the end plate 11. As illustrated in FIG. 4, the bent size of the bent shape portion 11a is set to be equal to or greater than the winding width of the winding portion on the tooth 6b.

Figure 4A:
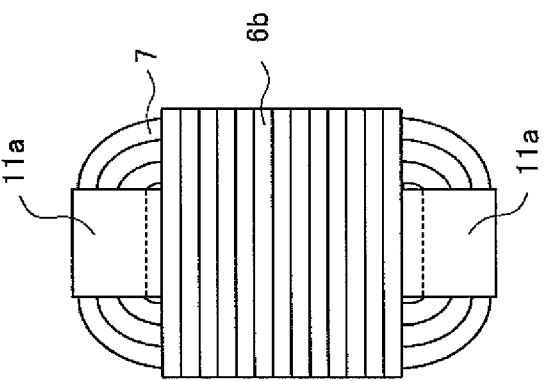
FIGS. 4A, 4B and 4C are views illustrating the power generating coil winding portion shown in FIG. 3, viewed from the right side, wherein each of FIGS. 4A, 4B and 4C shows a different example of the bent shape portion.
Figure 4B:
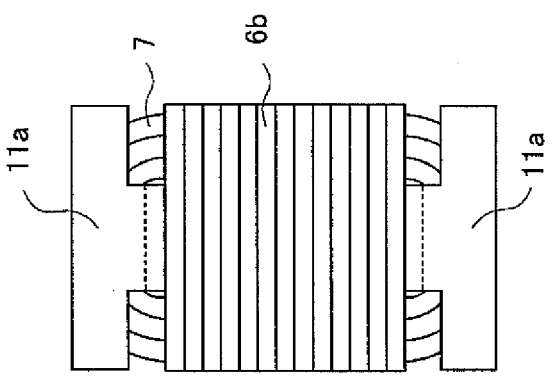
Figure 4C:
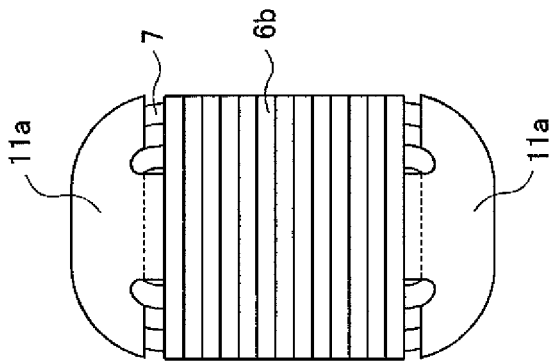

By forming the bent shape portion 11a at the tip end portion of the end plate 11 so as to have a bent size equal to or greater than the winding width of the winding portion of the tooth 6b in this way, it becomes possible to prevent the uncured varnish 12 from leaking out to the radially outward side at the time of the electrical heating for melt-bonding the powder resin 13. It should be noted that FIGS. 4A through 4C illustrate different examples of the bent shape portion 11a.

Figure 5B:
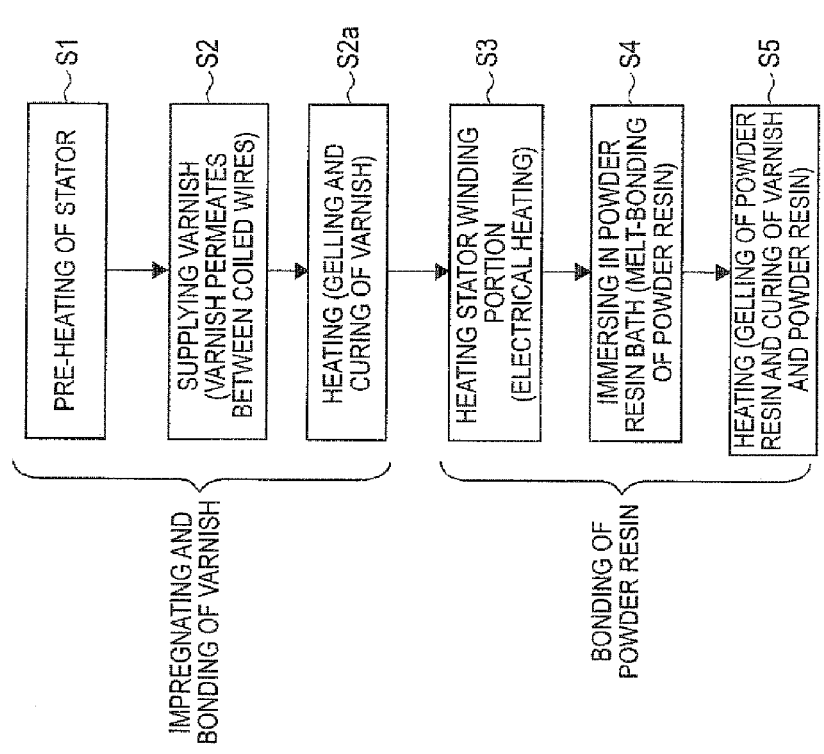
FIG. 5B shows a comparative techniques known by the inventor.
Figure 5A:
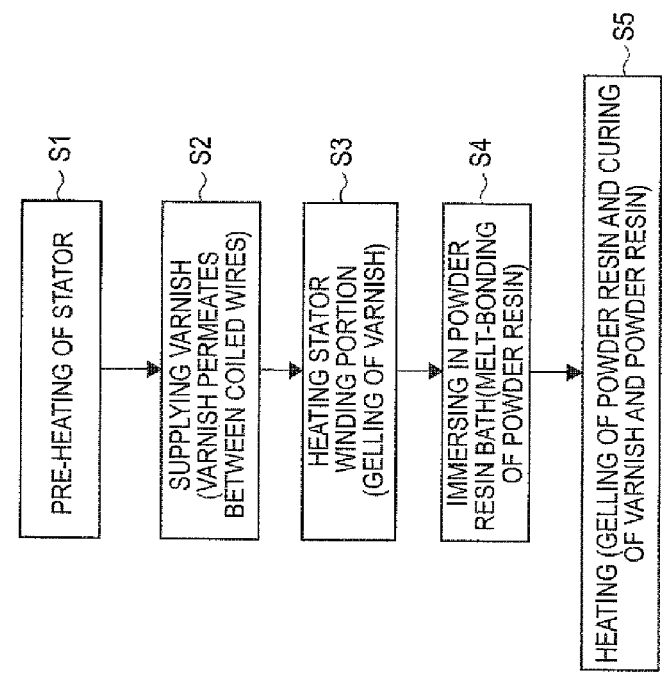
FIG. 5A shows a flow-chart for illustrating a bonding process of power generating coils according to the invention.

Next, the bonding process of the power generating coil 7 is described with reference to FIG. 5. FIG. 5 shows block diagrams for illustrating the bonding process of the power generating coil in comparison with techniques known by the inventor. FIG. 5A shows a bonding process of the power generating coil according to the first embodiment, and FIG. 5B shows techniques known by the inventor.

Referring to FIG. 5A, the stator 2 is preliminarily heated (step S1), and thereafter, the varnish 12 that uses a liquid-type thermosetting resin is supplied to the power generating coil 7 (step S2). Thereafter, in order to melt-bond the powder resin 13, the winding portion of the power generating coil 7 is heated in a thermostatic chamber (step S3). At this time, the varnish 12 supplied at step S2 is gelled. The reason why the stator 2 is preliminarily heated at step S1 is to make the permeability of the varnish 12 better.

After the winding portion of the power generating coil 7 has been heated at step S3, the stator 2 is immersed in a powder resin bath in which the powder resin 13 is accommodated, so as to melt-bond the powder resin 13 on the surface of the stator 2 (step S4). Thereafter, the stator 2 is heated in the thermostatic chamber, then the powder resin 13 is gelled, and a curing step of the varnish 12 and the powder resin 13 is performed (step S5).

Thus, in the method of manufacturing a stator of an electric rotating machine according to the first embodiment, the curing step for the varnish 12 in the bonding process of the power generating coil 7 is performed simultaneously with the heating, melt-bonding, and curing step for the powder resin 13. As a result, productivity can be remarkably improved. In contrast, in techniques known by the inventor, a gelling and curing step for the varnish 12 (step S2a) is performed after the process of step S2 of supplying the varnish 12 that uses the liquid-type thermosetting resin to the power generating coil 7, as shown in FIG. 5B. That is, the varnish 12 is impregnated and bonded, and thereafter, the winding portion of the power generating coil 7 is heated to melt-bond the powder resin 13, so that the powder resin 13 is melt-bonded to the surface of the stator 2. Consequently, productivity is reduced. It should be noted that, according to an experiment by the inventors, a more than 30% time reduction from the conventional method is made possible by simultaneously performing the heat-curing step of the impregnated varnish 12 and the melt-bonding step and curing process of the powder resin 13, which results in a thermal history corresponding to the curing condition for the varnish 12.

The method of manufacturing a stator of an electric rotating machine according to the first embodiment makes it possible to ensure the coiled wire quality and bonding strength between the coiled wires of the power generating coil 7 and in the winding portion lower layer portion of the power generating coil 7 as well as in the coiled wire surface portion including the coil end portion, and to improve the productivity at the same time.

Second Embodiment

Figure 6:
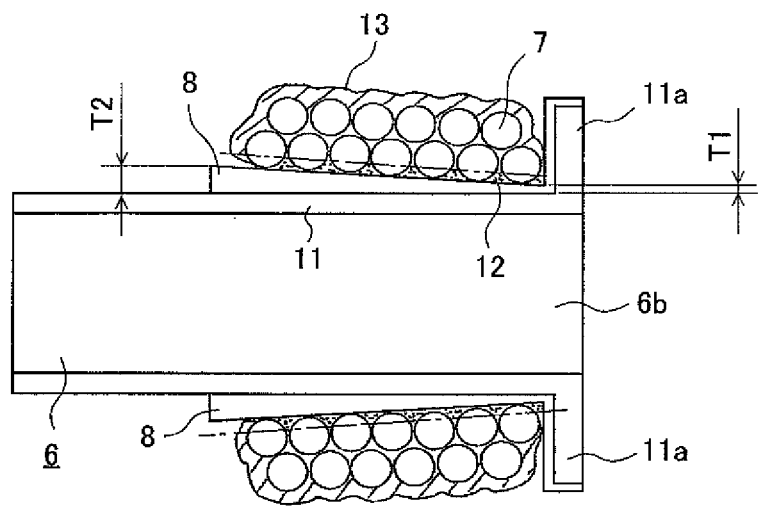
FIG. 6 is a detail view of a power generating coil winding portion of the magnet generator according to a second embodiment of this invention.

Next, a method of manufacturing a stator of electric rotating machine according to a second embodiment of this invention will be described below. FIG. 6 is a detail view of a power generating coil winding portion of a magnet generator according to the second embodiment.

The second embodiment is characterized in that, as shown in FIG. 6, the film thickness of the insulating film 8 at a radially inward region of the stator core 2 is formed to be thicker than the film thickness thereof at a radially outward region thereof. Specifically, referring to FIG. 6, the relationship of the film thickness of the insulating film 8 is set to be T2>T1, where the film thickness at the radially outward region of the stator core 2 is T1 and the film thickness at the radially inward region of the stator core 2 is T2. The other configurations are identical to those in the first embodiment, so the same or corresponding parts are designated by the same reference numerals and the explanations thereof are omitted.

When the film thickness of the insulating film 8 at a radially inward region of the stator core 2 is formed to be thicker than the film thickness thereof at a radially outward region thereof as in the second embodiment, the advantageous effects of the first embodiment can be obtained, and also, the varnish 12 can be prevented from leaking out to the radially inward side of the stator core 2 at the time of heating for melt-bonding the powder resin 13.

Third Embodiment

Figure 7:
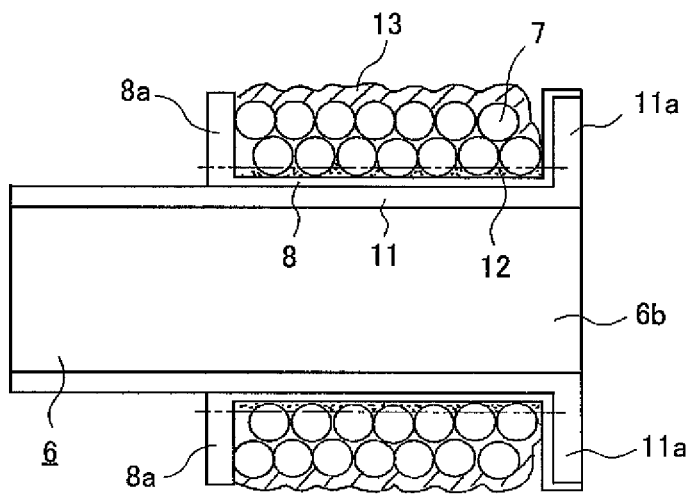
FIG. 7 is a detail view of a power generating coil winding portion of the magnet generator according to a third embodiment of this invention.

Next, a method of manufacturing a stator of electric rotating machine according to a third embodiment of this invention will be described below. FIG. 7 is a detail view of a power generating coil winding portion of a magnet generator according to the third embodiment.

In the third embodiment, an inner circumferential wall 8a is formed at a region of the insulating film 8 that is radially inward of the stator core 2 by molding a thermoplastic resin material, as shown in FIG. 7. This inner circumferential wall 8a is integrally formed with the insulating film 8. However, it is also possible that the inner circumferential wall 8a may be formed separately from the insulating film 8 and then integrated with the insulating film 8. The other configurations are identical to those in the first embodiment, so the same or corresponding parts are designated by the same reference numerals and the explanations thereof are omitted.

When the inner circumferential wall 8a is formed at a region of the insulating film 8 that is radially inward of the stator core 2 as in the third embodiment, the advantageous effects of the first embodiment can be obtained, and also, the varnish 12 can be prevented from leaking out to the radially inward side of the stator core 2 during the heating for melt-bonding the powder resin 13.

The first to third embodiments of this invention have been described hereinabove. However, various modifications and alterations of this invention will be apparent to those skilled in the art without departing from the scope and spirit of this invention, and it should be understood that this invention is not limited to the illustrative embodiments set forth herein.

What is claimed is:

1. A method of manufacturing a stator of an electric rotating machine, the stator including a plurality of teeth radially extended from a yoke portion formed by stacking steel sheets, a stator core having an insulating film on a surface of the teeth, and a winding portion comprising a plurality of layers of a coil wound around each of the plurality of teeth, the method comprising:
a step of pre-heating the stator and impregnating the coil in a lower layer portion of the winding portion with a varnish comprising a liquid thermosetting resin; a step of heating the winding portion of the stator for gelling the varnish; a step of covering the coil in a surface portion of the winding portion with a thermally meltable powder resin and melt-bonding the powder resin before curing the varnish; and a step of gelling the powder resin and simultaneously curing the varnish and the powder resin,
wherein the curing the varnish is performed in only one step.

2. The method of manufacturing a stator of an electric rotating machine according to claim 1, wherein a thickness of the thermosetting resin in an undermost layer of the winding portion having been impregnated with the thermosetting resin is formed to be equal to or greater than a thickness of the insulating coating film.

3. The method of manufacturing a stator of an electric rotating machine according to claim 1, wherein the insulating film thickness thereof is formed so that a film thickness thereof at a radially inward region of the stator core is thicker than a film thickness at a radially outward region of the stator core.

4. The method of manufacturing a stator of an electric rotating machine according to claim 1, wherein the insulating film is formed of a thermoplastic resin, and a protruding wall protruding in a layer direction of the winding portion is simultaneously molded on a radially inward side of the stator core.

5. A method of manufacturing a stator of an electric rotating machine according to claim 1, wherein the stator further comprises an end plate on both stacking direction-wise end faces of the steel sheet, and a bent shape portion having a bent size equal to or greater than a winding width of the winding portion is formed on the end plate at a tip end portion of each of the teeth.

* * * * *